(12) United States Patent
Beardsley et al.

(10) Patent No.: US 7,437,713 B2
(45) Date of Patent: Oct. 14, 2008

(54) AUTOMATED SYSTEM THAT TESTS SOFTWARE ON MULTIPLE COMPUTERS

(75) Inventors: Eric A. Beardsley, Kenmore, WA (US);
David C. Mitchell, Clinton, WA (US);
Brad P. Kirkpatrick, Redmond, WA (US); Jason A. Taylor, Carnation, WA (US); Donald R. Elkins, Fall City, WA (US); Richie Lai, Redmond, WA (US); Joseph M. Dibee, Seattle, WA (US); Freddie L. Aaron, Bothell, WA (US); Eric W. Ingman, Redmond, WA (US); George N. Stathakopoulos, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 488 days.

(21) Appl. No.: 10/043,792

(22) Filed: Jan. 10, 2002

(65) Prior Publication Data
US 2003/0131285 A1  Jul. 10, 2003

(51) Int. Cl.
*G06F 9/44* (2006.01)
(52) U.S. Cl. .................. 717/124; 717/103; 717/176
(58) Field of Classification Search ......... 717/124–135, 717/103, 176
See application file for complete search history.

(56) References Cited

U.S. PATENT DOCUMENTS

| 6,002,871 A * | 12/1999 | Duggan et al. ............ 717/135 |
| 6,163,805 A * | 12/2000 | Silva et al. ................ 709/227 |
| 6,487,577 B1 * | 11/2002 | Sundararajan ............. 718/102 |
| 6,546,547 B1 * | 4/2003 | Runyan et al. ............. 717/124 |
| 6,662,312 B1 * | 12/2003 | Keller et al. ............... 714/38 |
| 6,701,519 B1 * | 3/2004 | Cowan ...................... 717/130 |
| 6,775,823 B2 * | 8/2004 | MacDonell ................ 717/124 |
| 6,779,134 B1 * | 8/2004 | Laviolette et al. .......... 714/38 |
| 7,114,159 B2 * | 9/2006 | Avvari et al. .............. 719/316 |
| 2002/0129338 A1 * | 9/2002 | MacDonell ................ 717/126 |
| 2002/0184614 A1 * | 12/2002 | Davia et al. ............... 717/127 |

OTHER PUBLICATIONS

"An Enterprise Wide Calibration and Results Information Management System," Proceedings of National Conference of Standards Laboratories, vol. 2, pp. 627-634 (Aug. 25-29, 1996).
Puls, Carsten, "PXI and VXI Modular Instrumentation in the New Millennium," National Instruments, Austin, TX, pp. 623-625.
"Nose Out Application Troubles with CYRANO Impact," Infoworld Review CYRANO Impact, pp. 1-3 (2001).

* cited by examiner

*Primary Examiner*—Tuan Q. Dam
*Assistant Examiner*—Thuy Dao
(74) *Attorney, Agent, or Firm*—Workman Nydegger

(57) ABSTRACT

A system by which a software product may be tested on multiple client computers on various platforms. Product developers submit requests for tests on their products, in the form of test packets, to a test component, via an API. For each platform and language (i.e., group) on which a product developer wants a product tested, the product developer provides a test packet that defines tests that the product developer wants conducted on the product in that group. The test component searches, via an autolab component, for an available client machine for performing the tests in the test packet. The autolab component finds an available client computer, and the client machine is assigned the test packet. The client machine performs the tasks in the test packet, and forwards the results back to the test component.

8 Claims, 9 Drawing Sheets

AUTOMATED SYSTEM THAT TESTS SOFTWARE ON MULTIPLE COMPUTERS

FIELD OF THE INVENTION

This invention relates generally to software, and more particularly to software testing.

BACKGROUND OF THE INVENTION

Contemporary tests on software are performed in large labs that have multiple computers. To provide test data from a variety of platforms, testing may be performed on a variety of computers having different platforms (e.g., operating systems and upgrade levels), and/or languages. To limit the number of computers that are to be used in the lab, some of the individual computers may have several different platforms that are available on the computers, so that tests may be conducted on the same computers in multiple platforms.

To test the performance of a task within a particular software application, the software is loaded (if not already present) into a number of the computers and operators perform the task on each of the computers. For example, an application may be loaded and a particular user interface of the application may be displayed. Attempts may be made to display the user interface in several different platforms and/or languages. In the process of testing multiple platforms, a technician may run the task in one platform on a computer, reboot the computer to another platform, and run the test again. In addition, multiple computers having multiple platforms may be available, and technicians may perform the task on each of the multiple computers. In either situation, although a single technician may be able to perform tests on multiple machines, simultaneously performing tasks on multiple computers is an expensive process, requiring a large number of technicians to maintain several machines. In practice, only a subset of the available computers is used, and other computers sit idle between test processes, which wastes resources.

SUMMARY OF THE INVENTION

The present invention provides a system by which a software product may be tested on multiple clients in various environments and with minimal input from test technicians. To this end, one implementation of the present invention provides a test component that includes a database (e.g., a Structured Query Language (SQL) database). Product developers submit requests for tests on their products, e.g., in the form of test packets, to the test component, via an Application Programming Interface (API). For each platform and language (i.e., group) on which a product developer wants a product tested, the product developer provides a test packet that defines tests that the product developer wants conducted on the product in that group. The test packet includes a header having any pre-processing information, a list of specific tests that are to be run, and footer information, such as specifying clean-up information for the tests.

The test component places a new test packet in a database where it is placed in "pending" status. The test component then searches, via an autolab component, for an available client machine for performing the tests in the test packet. The client computers may be available to the test technicians, or may be located remotely. The autolab component finds an available client computer, and then places the new test packet in "assigned" status. The available client computer is then assigned the test packet.

In accordance with another aspect of the present invention, the client computers that are used with the test component are partitioned into three components: test (lab client daemon), control (lab client manager), and image. The lab client daemon is a standalone application capable of communicating with the test component directly (e.g., via ActiveX Data Objects (ADO)), or via a thin client, which may be used to translate the a communication from a client computer that is a different protocol (e.g., via the Transmission Control Protocol and the Internet Protocol (TCP/IP)) than the protocol of the test component to a protocol understood by the test component. When the client machine is not performing a task, the lab client daemon continually polls the test component to inform the test component that the client is available for performing tests. When the autolab component sends a test packet to the client, the lab client daemon receives the test packet and instructs the lab client manager to perform the tests within the client, which may include loading of a particular operating system and/or setting a particular language, and performing particular pre-processing steps as defined via the header. The lab client manager reports the results to the lab client daemon, and the lab client daemon sends results to the test component, e.g., "pass" or "fail." The pass or fail information is stored in a "complete" status file at the test component. The lab client daemon then resumes pinging of the test component to indicate that it is available for another test packet.

Other advantages will become apparent from the following detailed description when taken in conjunction with the drawings, in which:

DETAILED DESCRIPTION

Exemplary Operating Environment

Figure 1:
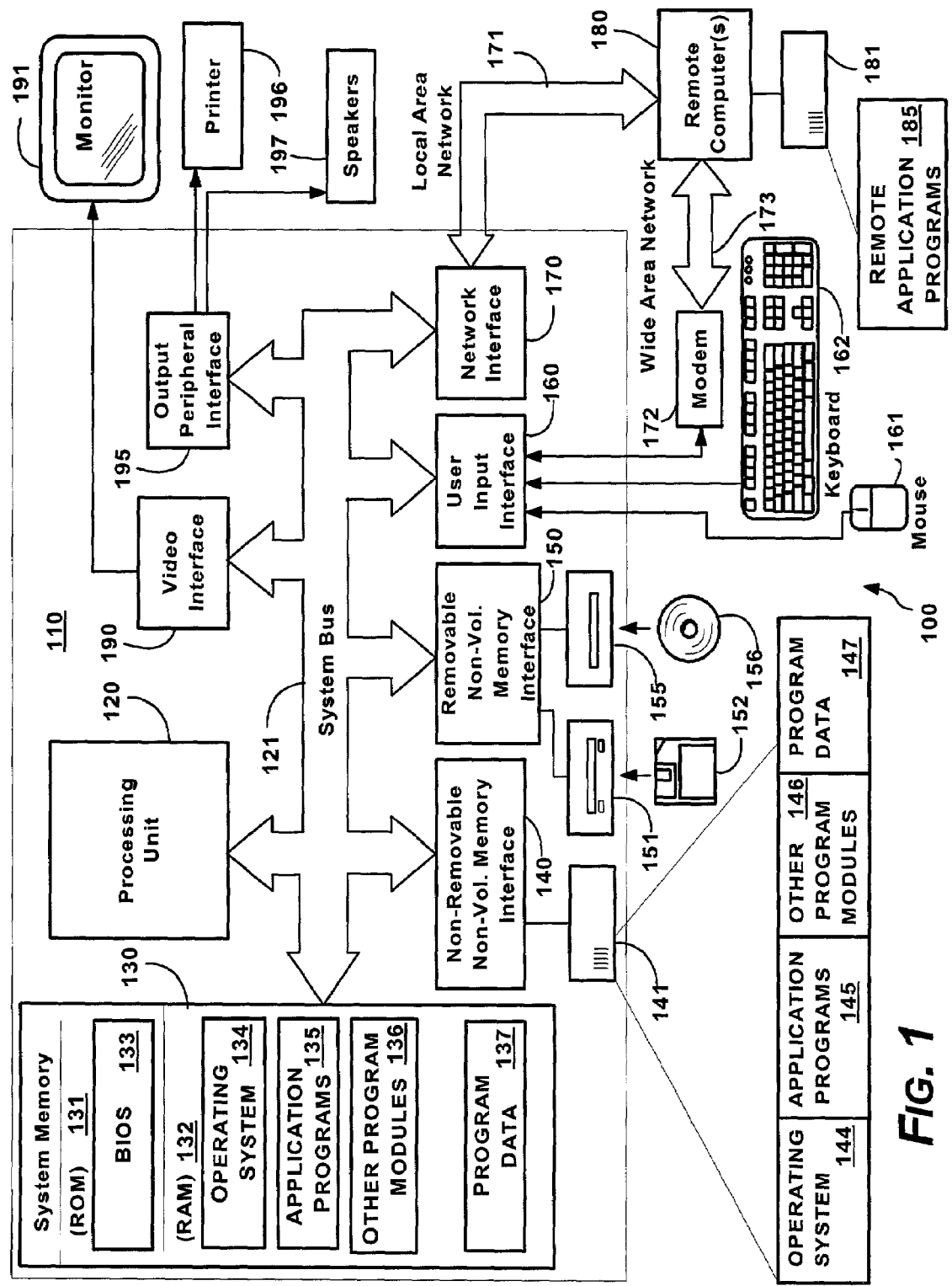
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 though a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are Exemplary and other means of establishing a communications link between the computers may be used.

Automated System that Tests Software on Multiple Computers

Figure 2:
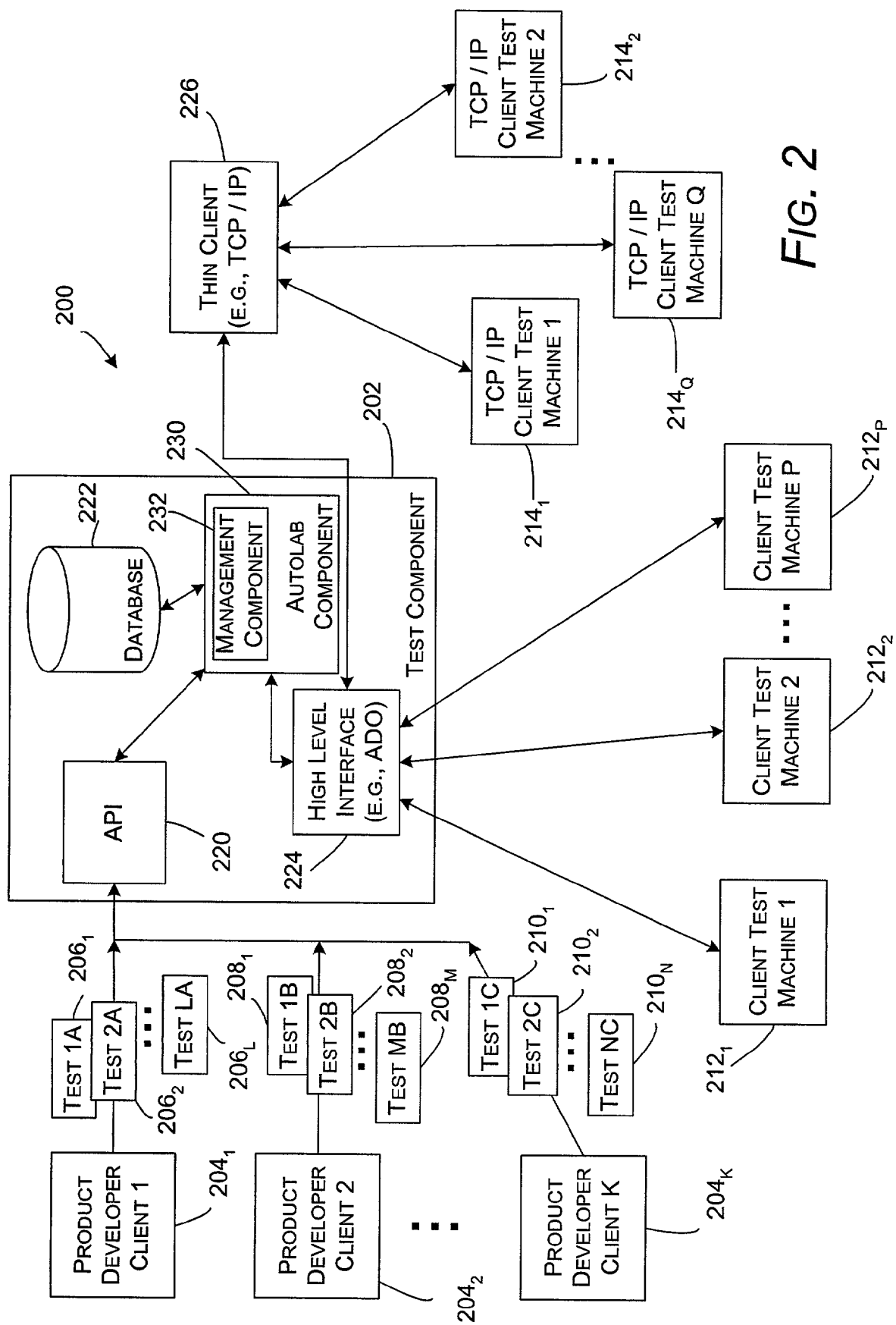
FIG. 2 is a block diagram of an architecture of a test system incorporating the present invention.

FIG. 2 shows a block diagram of an architecture of a test system 200 incorporating the present invention. In general, the test system 200 of the present invention includes a test component 202 to which a software product developer, such as one of several product developer clients $204_1$, $204_2$ ... $204_K$, may submit requests for tests on its product, in the form of test packets 206, 208, or 210. The test component 202, in turn, distributes the test packets 206, 208, or 210 to multiple client computers $212_1$, $212_2$ ... $212_P$, $214_1$, $214_2$ ... $214_Q$, which conduct the test instructions therein, and return the results to the test component 202.

The test component 202 may be provided, for example, on a server computer (e.g., the remote computer 180). Alternatively, the elements of the test component 202 may be distributed over a number of computers. Moreover, many of the elements of the test component 202 may be combined to form a single component, or the functions of the many components may be spread over multiple elements on the same machine or on multiple machines.

Test conditions may be provided to the test component 202 in a number of different ways. In general, the test conditions are provided as tasks that a product developer client 204 would like to be performed in particular platform(s) and language(s). Hereinafter, for ease of discussion, a selected platform and language are referred to herein as a "group." In the embodiment shown in FIG. 2, each product developer client 204 provides a separate test packet 206, 208, 210 for each group on which the product developer wants a product tested. The separate test packet defines tasks that the product developer wants conducted on the product in that group. The number of test packets 206, 208, 210 generated is set by the product developer client 204, and, in the example shown, the product developer client $204_1$ provides L test packets, the product developer client $204_2$ provides M test packets, and the product developer client $204_3$ provides N test packets. A product developer client 204 may provide only one test packet, or may provide several test packets, depending upon the scope of the testing desired.

Test conditions may be generated or produced in other ways. For example, the test component 202 may be provided test conditions, along with a list of groups in which a product developer client is interested, and from that information may generate the appropriate number of test packets.

Figure 3:
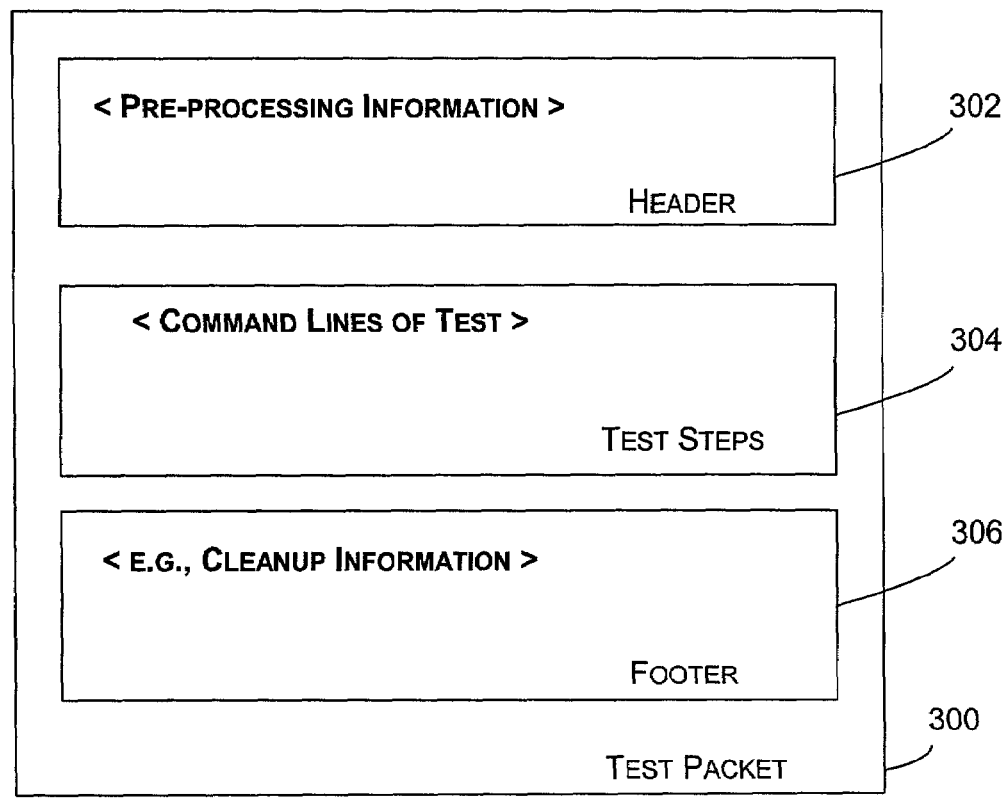
FIG. 3 is a representation of an example of a structure of a test packet for use in the system of FIG. 2.

An example of the structure of a test packet 300 is shown in FIG. 3. The test packet 300 includes a header 302 having pre-processing information, such as a list of files that are to be copied onto a client machine 212 or 214 before testing begins. The test packet 300 further includes the test steps, or tasks 304, that are to be conducted (e.g., the command lines of the test), and footer information 306, such as information that specifies clean-up information for the tests.

The test component 202 includes an application programming interface (API) 220 for receiving the test packets 206, 208, 210. A database 222 is located in, or otherwise is associated with, the test component 202. The database 222 is preferably a relational database, and may be distributed over several machines. As an example, the database may utilize Microsoft Corporation's SQL Server technology, but other database products may be used.

The test component 202 also includes a high-level interface 224 for communicating with clients having compatible communication software (i.e., that can communicate using the protocol utilized by the interface 224). The interface 224 permits client computers (e.g., client test computers $212_1$, $212_2$ ... $212_P$) that operate under compatible protocols to communicate with the test component 202 directly. As an example, the high-level interface 224 may be a high-level interface such as is provided in Microsoft Corporation's ActiveX® Data Objects (ADO) programming model, and the client computers $212_1$, $212_2$ ... $212_P$ may include communication software that is capable of communicating with the high-level interface. The interface of the ADO provides enhanced data access support, but other interfaces that utilize protocols that provide direct communication between the client computers $212_1$, $212_2$ ... $212_P$, and the test component 202 may be used.

If desired, a thin client 226 may be provided that is in communication with, or is otherwise associated with, the interface 224. The thin client 226 provides a translation of a protocol not compatible with the high-level interface 224 (e.g., TCP/IP) to a protocol that is compatible (e.g., ADO). For client computers that are not configured to communicate directly through the high-level interface 224 with the test component 202, the thin client 226 provides a means to communicate with the high-level interface 224. For example, the thin client 226 may be configured to permit client computers $214_1$, $214_2$ ... $214_Q$ to communicate with the test component 202 via TCP/IP protocol. In addition, the thin client 226 permits a client computer 212 to communicate with the test component before a direct connection is established with the high-level interface 224, as is further described below. To this end, the thin client 226 performs a translation of the information sent by the client computer so that the information may be utilized by the high-level interface 224. Although using direct communication between client computers is desired (e.g., direct communication between the interface 224 and the client computers $212_1, 212_2 \ldots 212_P$), use of the thin client 224 permits other client computers (e.g., the client computers $214_1, 214_2 \ldots 214_Q$) to be used with the test system 200, despite the their lack of the necessary software to directly communicate via the high-level interface 224.

The test component 202 also includes an autolab component 230 that is configured to search for client computers 212 or 214 that are available to run a test, and assigns the tests to available client computers. The function and operation of the autolab component 230 is further described below.

Figure 4:
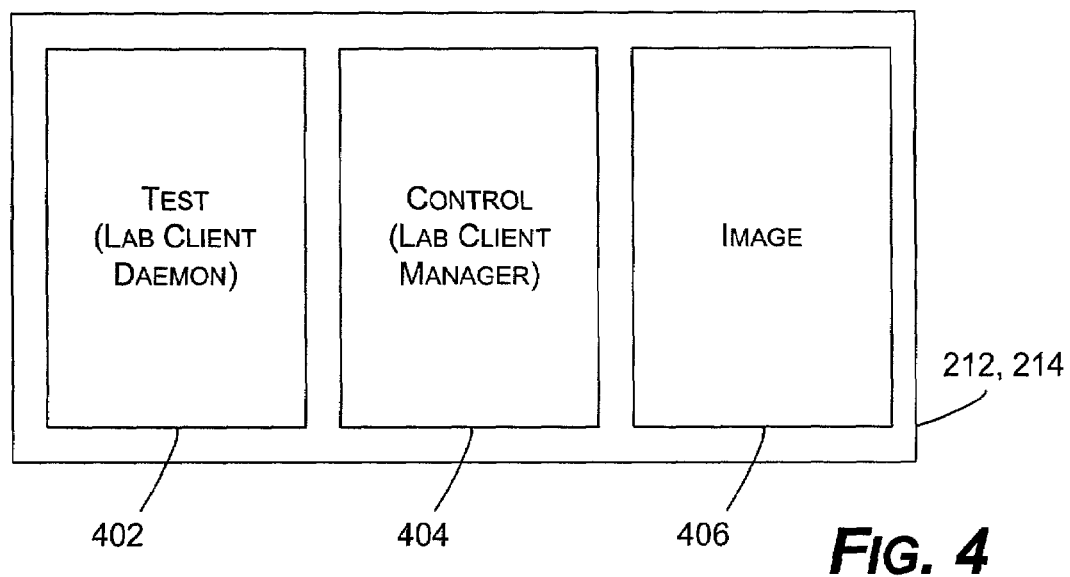
FIG. 4 is a block diagram representing an architecture of a client computer for use in the system of FIG. 2 in accordance with an aspect of the invention.

In accordance with one aspect of the present invention, as can be seen in FIG. 4, the client machines 212, 214 that are used with the test component 202 are partitioned into three components: test (lab client daemon) 402, control (lab client manager) 404, and image 406. The lab client daemon 402 is a standalone application configured to communicate with the test component 202. The lab client daemon 402 may communicate with the test component directly through the high-level interface 224 (e.g., via ADO), or may communicate via the thin client 226 (e.g., via TCP/IP). The lab client manager 404 is configured to cause the tests and other tasks in a test packet to be performed in the image 406. The functions and operation of each of these components are further described below.

Figure 5:
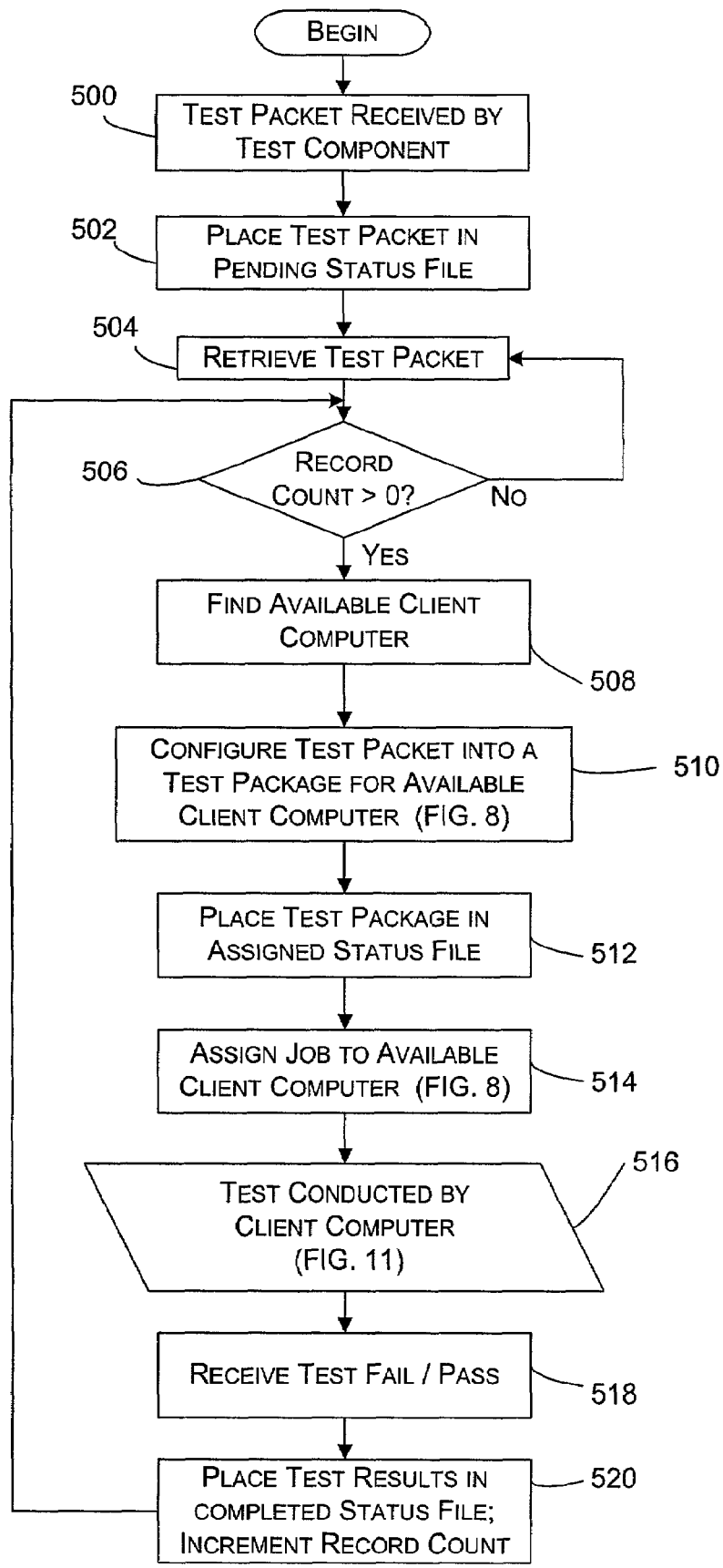
FIG. 5 shows a general overview of a process for testing software on multiple client machines in accordance with one aspect of the present invention.

Turning now to an explanation of the operation of the present invention, FIGS. 5, 7, 8, and 9 generally show processes that may be performed by the test component 202 in accordance with the present invention. FIG. 5 shows a general overview of a process for testing software on multiple client machines in accordance with one aspect of the present invention. As described above, tasks in a test packet may be conducted by a client machine 212 or a client machine 214, depending upon the protocol available on the client machine. For ease of reference, unless specific to one of the client machines 212 or 214, the operations herein will be discussed as being performed by a client machine "212, 214," emphasizing that either may be used.

In any event, beginning at step 500, the test component 202 receives a test packet (e.g., one of the test packets $206_1, 206_1, 206_L$ from the product developer client $202_1$) via the API 220. The received test packet is placed in a "pending" status file 602 (FIG. 6) in the database 222 at step 502.

At step 504, the autolab component 230 retrieves one of the pending test packets from the database 222. A determination is made if all tests have been run on the packet at step 506 (e.g., whether a record count is zero), and, if so, the process loops back and the next packet is retrieved at step 504. If not, then step 506 branches to step 508, where the test component 202 searches, via the autolab component 230, for an available client machine 212, 214 for performing the tests in the test packet. As further described below, an available client machine 212, 214 may be idle and awaiting a test packet, or may already be running the tasks in a test packet, but should be capable of (e.g., includes the proper groups and applications for) running the tasks of the test packet.

Figure 6:
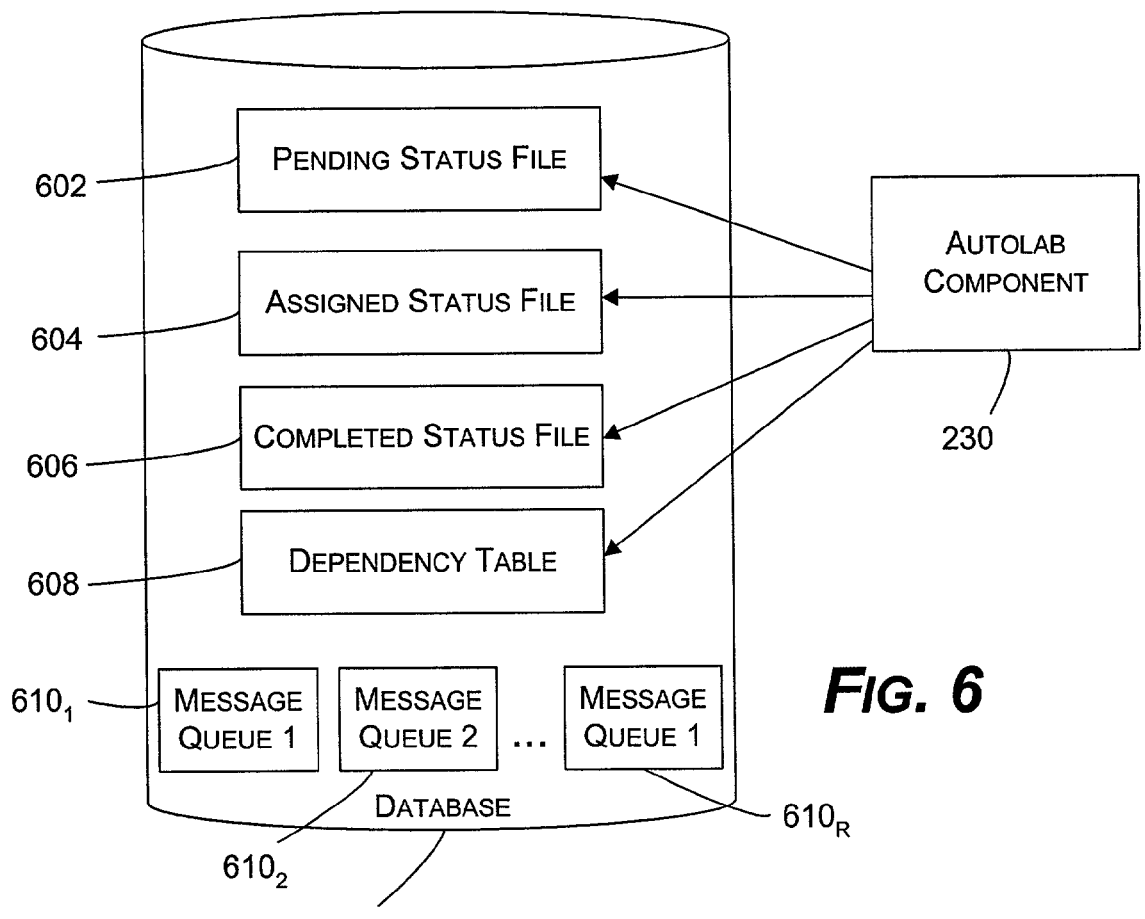
FIG. 6 is a block diagram representing an architecture of a database for use in the system of FIG. 2.

At step 510, the autolab component 230 configures the test packet to a personalized test package for the available client computer 212, 214. The test package is then placed, at step 512, in an "assigned" status file 604 (FIG. 6). The client machine 212, 214 is then assigned the test packet at step 514. Configuring and assigning the test package is described further in connection with FIG. 8, below.

Figure 10:
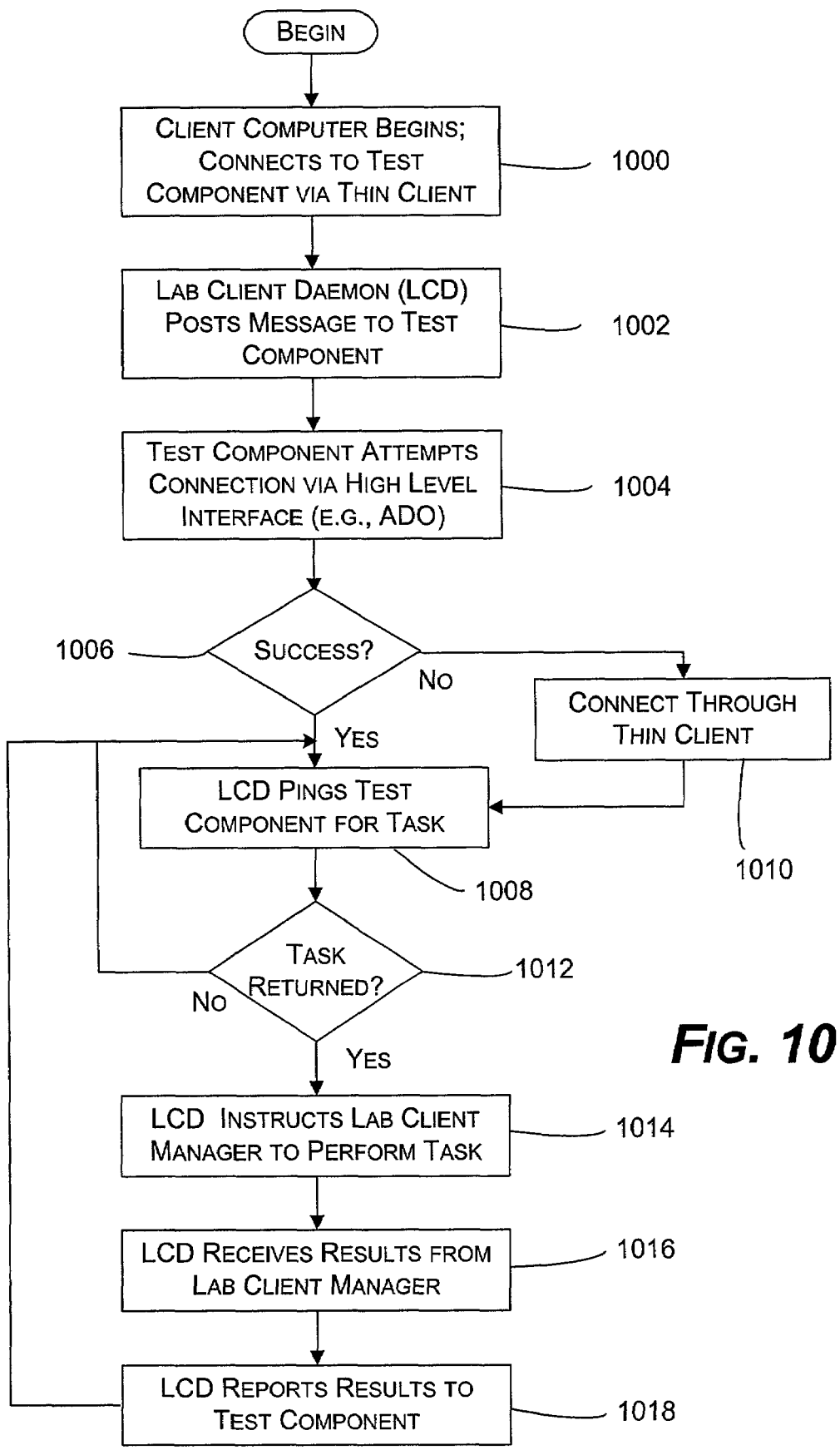
FIG. 10 shows a general overview of the operation of a lab client daemon for a client computer of the system of FIG. 2 in accordance with one aspect of the present invention.

The tasks in the test packet are conducted by the client computer 212, 214 at step 516 (described further in connection with FIG. 10). The client computer 212, 214 forwards the results of the test (pass or fail) to the test component 230 (step 518), and the results are placed in a completed status file 606 (FIG. 6), and the record count for the test packet is incremented, at step 520. The process then loops back to step 506, where a determination is made whether all tests for the test packet have been conducted (e.g., whether the record count for the test packet is zero).

Figure 7:
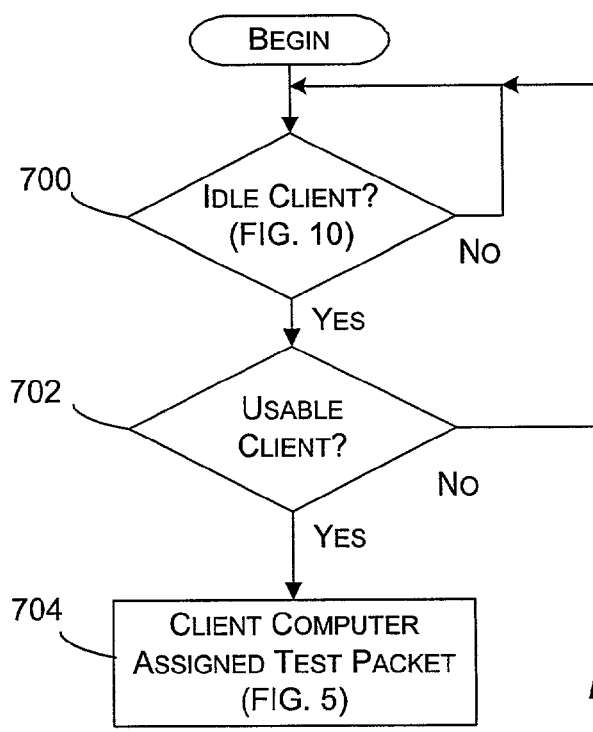
FIG. 7 shows a general overview of a process for assigning a test packet to an idle client computer in accordance with one aspect of the present invention.

FIG. 7 shows a general overview of a process for assigning a test packet to a client computer in accordance with one aspect of the present invention. Beginning at step 700, a check is made as to whether there are any idle client computers 212, 214. The process by which a client computer 212, 214 indicates to the test component that it is idle is described in connection with FIG. 10, below. If a client computer is not available, the process loops back and awaits an idle client.

If a client computer 212, 214 is available, step 700 branches to step 702, where the test component 202 checks to see if the computer is usable. That is, the autolab component 230 determines whether the client computer includes a group and application that meets the requirements of a pending test packet. If not, the process branches back to step 700, where a check is made for other idle client computers 212, 214. If the client computer includes a group and application that meets the requirements of a pending test packet, then step 702 branches to step 704, where the client computer is assigned a test packet (FIG. 5).

Figure 8:
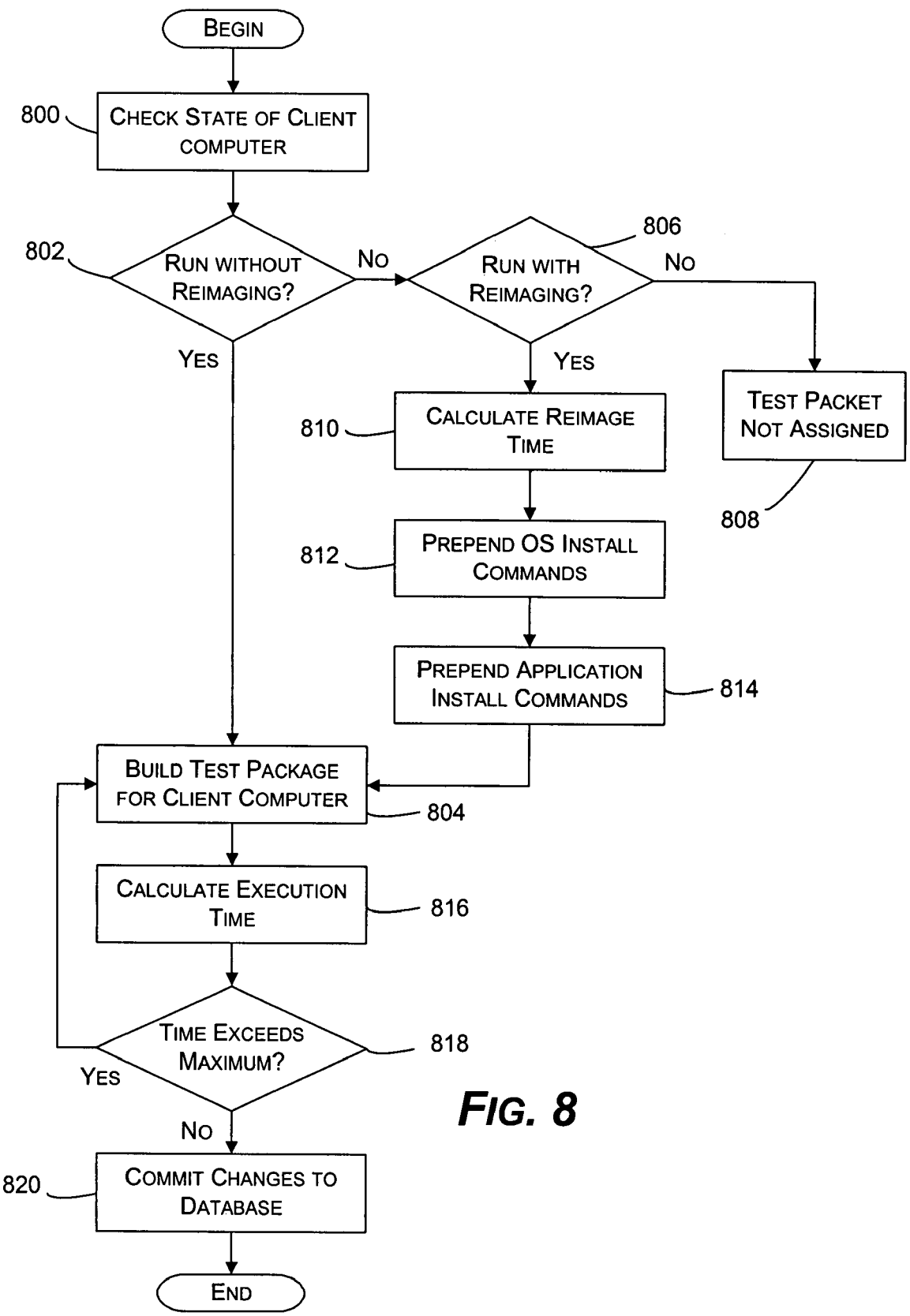
FIG. 8 shows a general overview of a process for configuring a test packet into a personalized test package for the available client computer, and assigning the test package to the client computer, in accordance with one aspect of the present invention.

FIG. 8 shows a general overview of a process for configuring a test packet into a personalized test package for the available client computer 212, 214, and assigning the test package to the client computer, in accordance with one aspect of the present invention. Beginning at step 800, the autolab component 230 checks the state (e.g., what applications are loaded and what group and/or applications are presently imaged) of the client computer 212, 214. At step 802, a determination is made whether there are pending test packets that can be run on the client computer without the client computer reimaging. That is, whether the tasks of the test packet may be performed on the client computer 212, 214 using the existing group and applications that are imaged by the computer. If so, step 802 branches to step 804, where a personalized test package is built for the client, which may include, for example, preprocessing information and application commands.

If there are not pending test packets that can be run on the client computer, then step 802 branches to step 806, where a determination is made whether there are pending test packets that may be run on the client computer 212, 214 with reimaging. That is, although the existing group may not be used, a determination is made whether the computer includes a group that may be used. Using such a group may require rebooting of the client computer 212, 214 to a different operating system and/or installation of software on which to run the tests.

If the client computer does not include a group and application that may be used, then step 806 branches to step 808, where the client computer 212, 214 is not assigned a test packet. If the computer does include a group and application(s) that may be used, then step 806 branches to step 810, where the reimage time of imaging the proper group and/or applications is calculated. At step 812, operating system installation commands are prepended to (i.e., attached to the beginning of) the test packet, and at step 814 application installation commands required by the test are prepended to the test packet. The process then proceeds to step 804, where a personalized test package is built for the client, which may include, for example, the prepended operating system installation commands and application installation commands, and application commands.

At step 816, the execution time for the package is calculated. If desired, an execution time may be defined at which the test component may not allow the tasks to be performed by the computer. If too long, then step 818 branches back to step 804, where a new package is formed. If not too long, then step 818 branches to step 820, where the changes in the package are committed to the database (e.g., saved in the assigned status file 604).

The autolab component 230 may include managing abilities, such as in a management component 232 (FIG. 2), that permit the autolab component 230 to pre-assign test packages to a client computer 212, 214 based upon the client computer's imaging abilities. The available client machine may be idle, or may be capable of performing the tasks, but at the time of assignment of the task, is already performing another task. If the client computer 212, 214 is already performing another task, the test packages may be maintained, for example, in a message queue 610 (FIG. 6) for a client computer that is maintained, for example, in the database 222. A separate message queue $610_1, 610_2 \ldots 610_R$ may be maintained for each client computer 212, 214. Items may be placed in the message queue 610 based upon the relative availability of the client computer 212, 214 (e.g., how few tasks are in a respective client computer's message queue as compared to the number of tasks in other computer's message queue). The client computer 212, 214, after completing a task, may check its message queue 610 for the next task or bundle of tasks (a "job"). In this manner, test packets and/or tasks may efficiently be assigned to client computers 212, 214 before the client computers are idle. Thus, one or more test packages may be available for the client computer 212, 214 immediately after the tasks of a previous test package have been completed. In accordance with one aspect of the present invention, the management component 232 may even reorder test packets, or tasks within those packets, for more efficient running of the client computer 212, 214.

Figure 9:
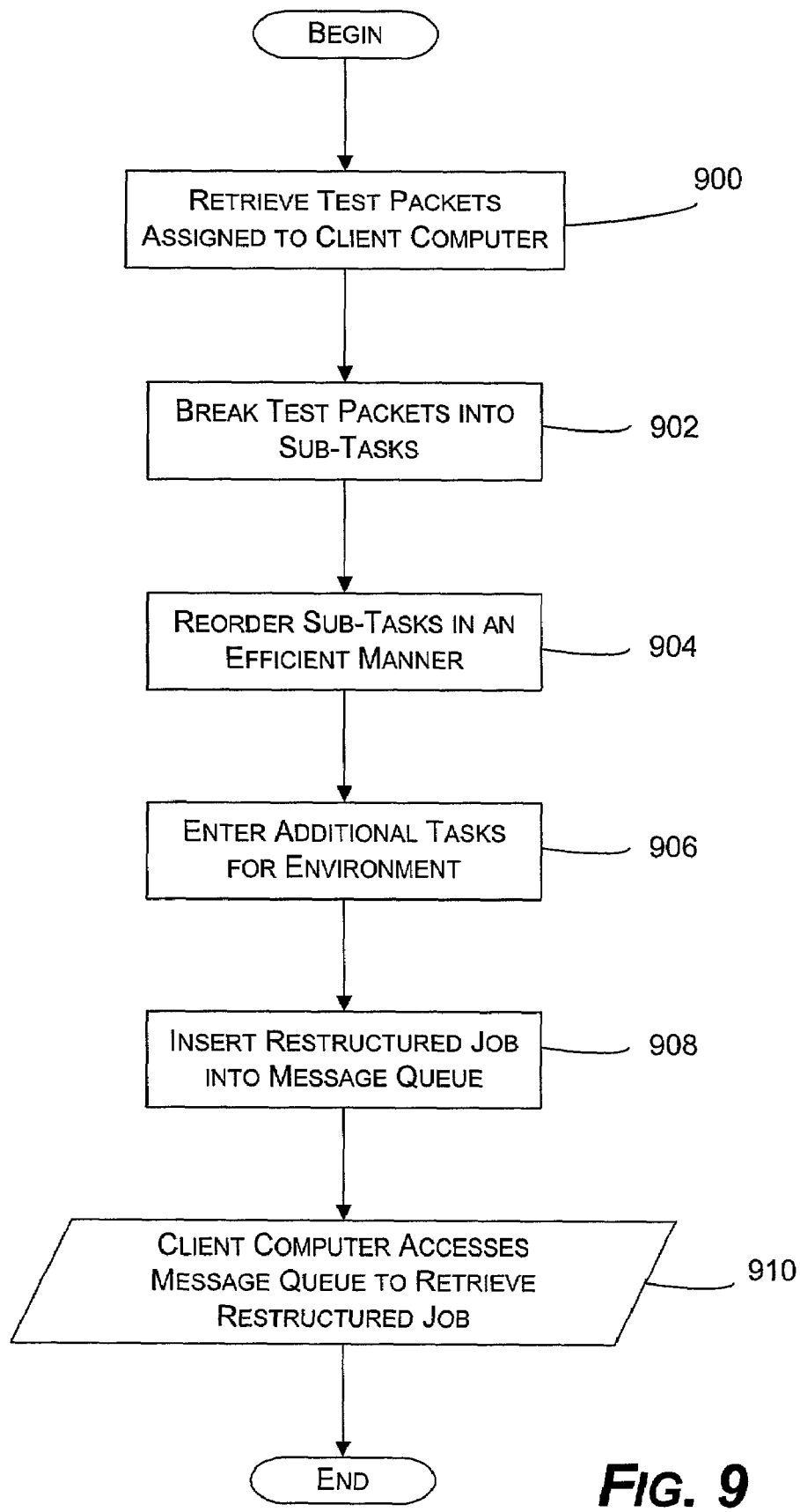
FIG. 9 shows a general overview of operation of management features of an autolab component for the system of FIG. 2 in accordance with one aspect of the present invention.

FIG. 9 shows a general overview of the operation of the management component 232 in accordance with one aspect of the present invention. Beginning at step 900, all test packets that have been assigned to a client computer 212, 214 are retrieved that have not already been forwarded to the client computer 212, 214. At step 902, the test packets are broken into subtasks by the management component 232, such as installing an application, performing particular tasks on an application, or the like. The subtasks then are reordered in an efficient manner (step 904). The tasks may be reordered, for example, so that all tasks that are to be performed in a particular application are performed after loading or installing of the application. This process may be performed, for example, by checking the subtasks against a dependency table 608 (FIG. 6) so that they may be efficiently ordered. Additional tasks may be entered (step 906) to fulfill requirements of a computing environment, if needed. The additional tasks may also be maintained in the dependency table 608.

After the subtasks have been reordered, the reconstructed job is inserted into the client computer's message queue 610 (step 908). The reconstructed job may then be accessed by the client computer when the client computer is next available (step 910). The tasks of the restructured job may be accessed one task at the time by a client computer 212, 214, or may be issued to the client computer as a job.

Figure 11:
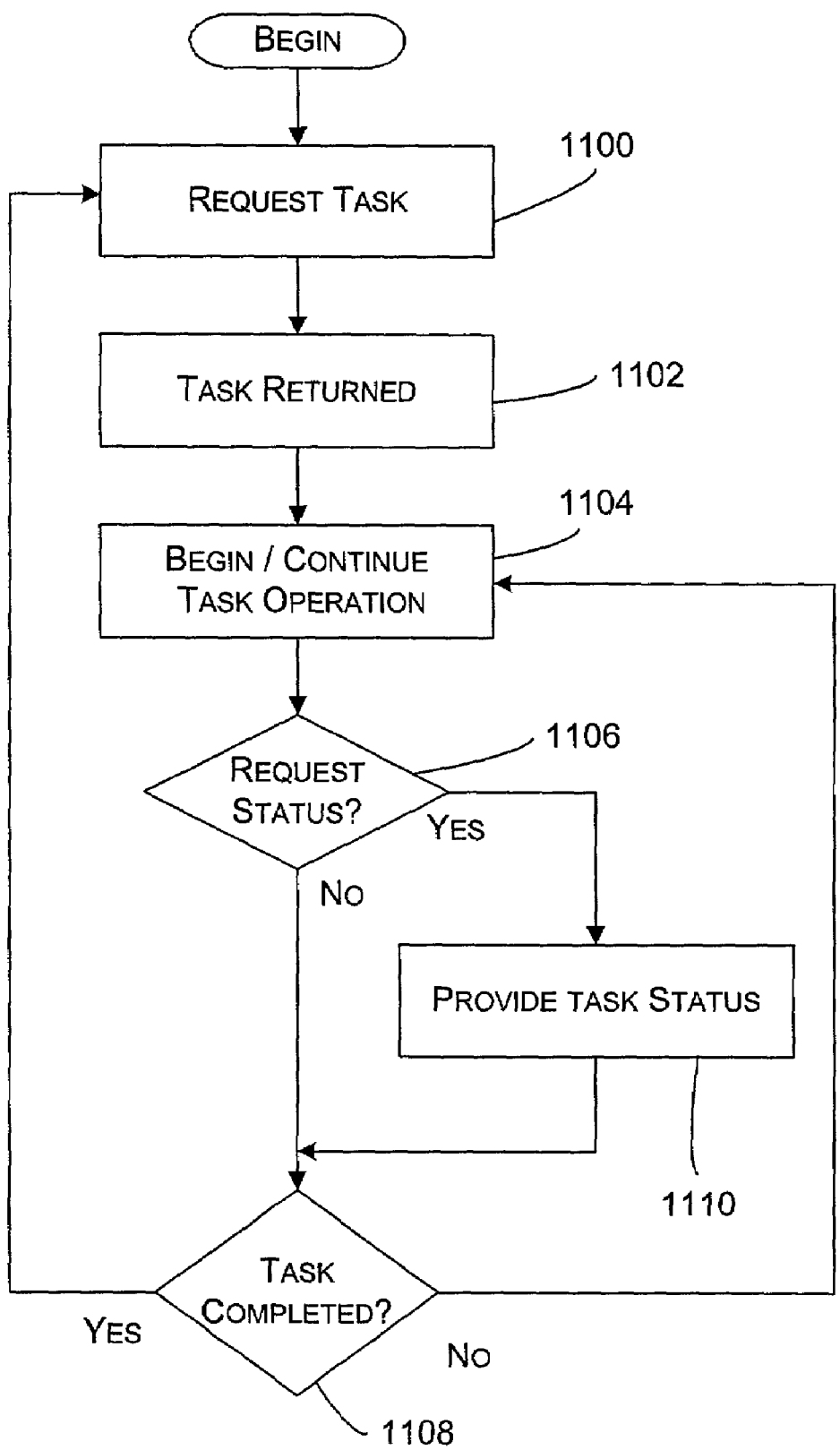
FIG. 11 shows a general overview of operation of a lab client manager for a client computer of the system of FIG. 2 in accordance with one aspect of the present invention.

Some processes performed by the client machines 212, 214 are generally shown in FIGS. 10-11. FIG. 10 shows a general overview of the operation of the lab client daemon 402 in accordance with one aspect of the present invention. Beginning at step 1000, a client computer 212, 214 starts up and connects to the test component 202 via the thin client 226. The lab client daemon 402 posts a message to the test component 202 (step 1002), and at step 1004, the test component tries to initiate connection through the high-level interface 224 (e.g., ADO). If successful, then step 1006 branches to step 1008, where the lab client daemon 402 calls the test component 202 to request a task.

The request to initiate connection through the high-level interface 224 may fail, either because of a lack of an answer to the request, or because the client computer 212, 214 is not capable of communicating via the high-level interface. If the request returns failure, then step 1006 branches to step 1010, where the connection is established through the thin client 226. The lab client daemon 402 then calls the test component 202 to request a task at step 1008.

At step 1012, a determination is made whether a work item, such as a test package, task, or job, has been returned by the test component 202. If not, the process loops back to step 1008, where the lab client daemon 402 again requests a task. This process continues, so that when the client machine 212, 214 is not performing a task, the lab client daemon 402 continually polls the test component to inform the test component that the client is available for performing tests. The lab client daemon 402 pings the test component 202 (e.g., on an interval) until the lab client daemon receives a task.

If the autolab component 230 sends a test package to the client computer, step 1012 branches to step 1014, where the lab client daemon 402 receives the test package and instructs the lab client manager 404 to perform the tasks within the image 406. These tasks may include loading of a particular operating system and/or setting a particular language, and performing particular pre-processing steps as defined via the header. The lab client manager 404 reports the results to the lab client daemon 402 (step 1016), and the lab client daemon sends a "pass" or "fail" to the test component (step 1018). As described earlier, the pass or fail information is stored in the complete status file 606 at the test component 202. The process then loops back to step 1008, where the lab client daemon 402 resumes pinging of the test component 202 to indicate that it is available for another test package or job.

FIG. 11 shows a general overview of operation of the lab client manager 404 in accordance with one aspect of the present invention. There are a variety of different tasks that may be performed by the lab client manager 404, and corresponding commands by the lab client daemon 402. As non-limiting examples, the lab client manager 404 may be commanded to reboot to another operating system, get machine information, get registration information, get file information, restore an image, create an image, download a file, install an application, sleep for a specified time, synchronize system tools to assure that items are available for a test, and shut itself down. The operations may be performed in a desired order as needed to complete a particular task or varied tasks. Some or all of the tasks may require that the lab client manager 404 send a status report to the test component 202, as further described below.

In any event, beginning at step 1100, upon start of the lab client manager 404, the lab client manager requests a task or list of tasks to perform (e.g., from the test component 202 via the lab client daemon 402). The task or tasks are returned at step 1102, and the lab client manager 404 begins operation of a task in step 1104.

At step 1106, a determination is made whether a status request is included in the task. A status request calls for a report of the status of the task at a particular point in the operation of the task, such as at imaging of a particular window, or at completion of the task. If a status request is not present, step 1106 branches to step 1108, where a determination is made whether the task has been completed. If a status request is present, then step 1106 branches to step 1110, where the lab client manager 404 provides status information (e.g. to the test component 202 via the lab client daemon 402). The process then proceeds to step 1108, where a determination is made whether all tasks have been completed. If not, step 1108 branches back to step 1104, where operation of the task continues. If the task is complete, then step 1108 branches back to step 1100, where the lab client manager 404 requests another task.

The present invention provides a number of benefits over prior art testing systems. The testing system is designed so that it may be used with remote client test computers. In addition, the test component 202 efficiently assigns tasks and/or test packages to the client computers so that an optimal number of the computers may be utilized at one time. The operations may be performed with minimal test technician involvement, thus providing an inexpensive test solution.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a networked computing environment, a method for testing software on one or more of a plurality of platforms and with one or more of a plurality of languages the method comprising:
   receiving test conditions defining tests on developed computer program products;
   receiving group information, the group information defining a selected platform and language for each of one or more groups;
   storing the test conditions and group information as a test packet in a database, the test packet defining one or more tasks to be performed for a particular group;
   searching for available test clients that are available to perform a test job including tasks for a particular group defined in the test packet, wherein searching for test clients comprises searching according to loading capacity;
   selecting the test packet from the database, wherein selecting the test packet from the database further comprises:
      first determining if any pending test packets can be selected for the available test client such that a pending test packet can be run on the available test client without reimaging the available test client, and if test packet is a pending test packet that can be selected for the available test client such that the test packet can be run on the available test client without reimaging the available test client, selecting the test packet for the available test client and automatically building and assigning a test package with tasks from the selected test packet to the available test client; but
      if a pending test packet cannot be selected for the available test client such that the pending test packet can be run on the available test client without reimaging the available test client, then determining if the test packet is a pending test packet that can be selected for the available test client such that the test packet can be run on the available test client with reimaging the available client, and if the test packet can be run on the available test client with reimaging the available test client then selecting the test packet for the available test client and automatically building and assigning a test package with tasks from the selected test packet to the available test client and;
      calculating an execution time for the test package and if the calculated execution time exceeds a predetermined allowable execution time, automatically building and assigning a different test package to the available test client with tasks from the test packet.

2. The method of claim 1, wherein the database is configured to store a particular test job in a pending status prior to the particular test job being assigned to an available test client.

3. The method of claim 1, wherein the database is configured to store a particular test job in an assigned status while the particular test job is assigned to an available test client.

4. The method of claim 1, wherein the database is configured to store a particular test job in a completed status after the particular test job has been run by one of the test clients.

5. The method of claim 1, further comprising, further comprising storing information about test jobs that have been assigned to a test client in a message queue for the available test client.

6. The method of claim 1, further comprising separating one or more of the test jobs into subtasks, and ordering the subtasks into a reordered job, wherein ordering is performed based on subtask dependencies on the loading or installing of a particular application, ordering being performed to make processing of subtasks more efficient.

7. The method of claim 1, further comprising creating a personalized test package for the available test client based upon the platform and applications available at the available test client.

8. The method of claim 1, wherein automatically assigning the test job to an available test client is based upon the present imaging of the available test client.

* * * * *

UNITED STATES PATENT AND TRADEMARK OFFICE
CERTIFICATE OF CORRECTION

| | | |
|---|---|---|
| PATENT NO. | : 7,437,713 B2 | Page 1 of 1 |
| APPLICATION NO. | : 10/043792 | |
| DATED | : October 14, 2008 | |
| INVENTOR(S) | : Beardsley et al. | |

It is certified that error appears in the above-identified patent and that said Letters Patent is hereby corrected as shown below:

In column 2, line 8, after "translate" delete "the".

In column 4, line 32, after "drive" insert -- 151 that reads from or writes to a removable, nonvolatile magnetic disk 152, and an optical disk drive --.

In column 4, line 40, delete "though" and insert -- through --, therefor.

Signed and Sealed this
Third Day of May, 2011

David J. Kappos
*Director of the United States Patent and Trademark Office*